United States Patent
Hsiao

(10) Patent No.: US 9,425,489 B2
(45) Date of Patent: Aug. 23, 2016

(54) CHARGING AND DISCHARGING SYSTEM FOR ELECTRONIC DEVICE

(71) Applicant: ScienBiziP Consulting (Shen Zhen) Co., Ltd., Shenzhen (TW)

(72) Inventor: Jen-Jung Hsiao, New Taipei (TW)

(73) Assignee: ScienBiziP Consulting (Shenzhen) Co., Ltd., Shenzhen (CN)

( * ) Notice: Subject to any disclaimer, the term of this patent is extended or adjusted under 35 U.S.C. 154(b) by 302 days.

(21) Appl. No.: 14/261,719

(22) Filed: Apr. 25, 2014

(65) Prior Publication Data

US 2015/0035489 A1    Feb. 5, 2015

(30) Foreign Application Priority Data

Aug. 5, 2013   (TW) .............................. 102127923 A

(51) Int. Cl.
| | |
|---|---|
| *H02J 7/00* | (2006.01) |
| *H01M 10/44* | (2006.01) |
| *H01M 2/20* | (2006.01) |
| *H01M 10/42* | (2006.01) |

(52) U.S. Cl.
CPC ........... *H01M 10/441* (2013.01); *H01M 2/202* (2013.01); *H01M 10/4207* (2013.01)

(58) Field of Classification Search
CPC ......... H01M 10/441; H01M 10/4207; H01M 2/202

USPC ......................................................... 320/118
See application file for complete search history.

(56) References Cited

U.S. PATENT DOCUMENTS

| | | | | |
|---|---|---|---|---|
| 8,958,934 | B2* | 2/2015 | Nishida | H02J 7/0026 180/65.21 |
| 9,018,905 | B2* | 4/2015 | Lim | B60L 11/1861 320/116 |
| 2012/0133329 | A1* | 5/2012 | Yoshida | H01M 10/441 320/116 |

* cited by examiner

*Primary Examiner* — Jack Chiang
*Assistant Examiner* — Brandon Bowers
(74) *Attorney, Agent, or Firm* — Zhigang Ma

(57) ABSTRACT

A charging and discharging system is disclosed. The charging and discharging system includes a first cell assembly and a second cell assembly. The first battery cell assembly includes a first cell, a first connecting piece, and a second connecting piece. The second cell assembly includes a second cell, a third connecting piece, and a fourth connecting piece. The first connecting piece and the second connecting piece connect the first cell to a circuit board. The third connecting piece and the fourth connecting piece connect the second cell to the circuit board. A length of the third connecting piece and the fourth connecting piece is greater than a total length of the first connecting piece and the second connecting piece. A resistivity of the third connecting piece and the fourth connecting piece is smaller than a length of the first connecting piece and the second connecting piece.

14 Claims, 2 Drawing Sheets

CHARGING AND DISCHARGING SYSTEM FOR ELECTRONIC DEVICE

FIELD

Embodiments of the present disclosure relate to electronic systems, and particularly to a charging and discharging system.

BACKGROUND

A battery assembly includes a battery cell. When two battery assemblies are connected in series, a nickel piece connects the two battery cells of the two battery assemblies in series. A resistance of the nickel piece increases as a length of the nickel piece increases.

BRIEF DESCRIPTION OF THE DRAWINGS

Many aspects of the embodiments herein can be better understood with reference to the following drawings. The components in the drawings are not necessarily drawn to scale, the emphasis instead being placed upon clearly illustrating the principles of the embodiments. Like reference numerals designate corresponding parts throughout the several views of the drawings.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
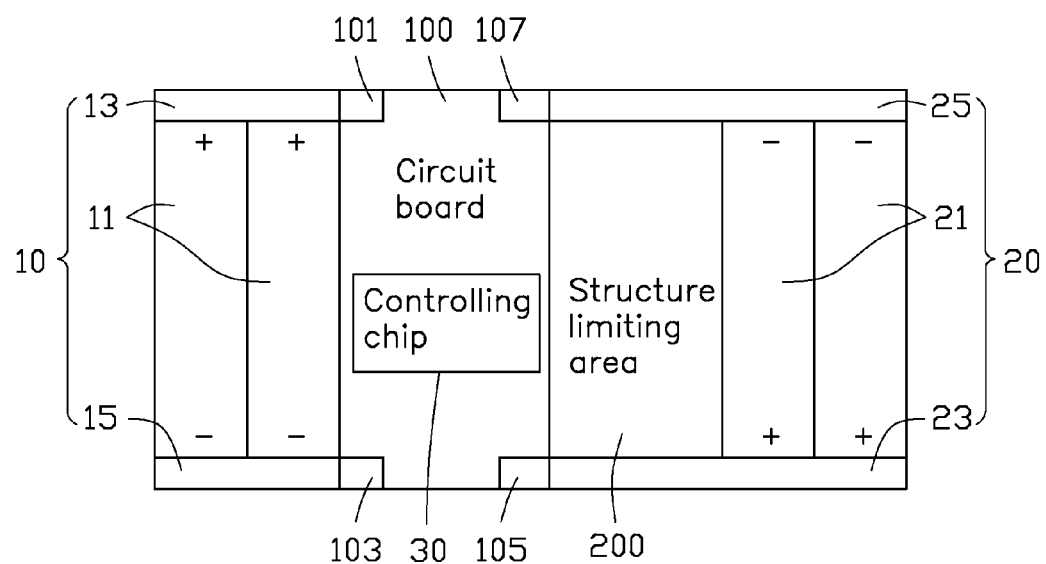
FIG. 1 is a structure schematic view of an embodiment of a charge and discharge system.
Figure 2:
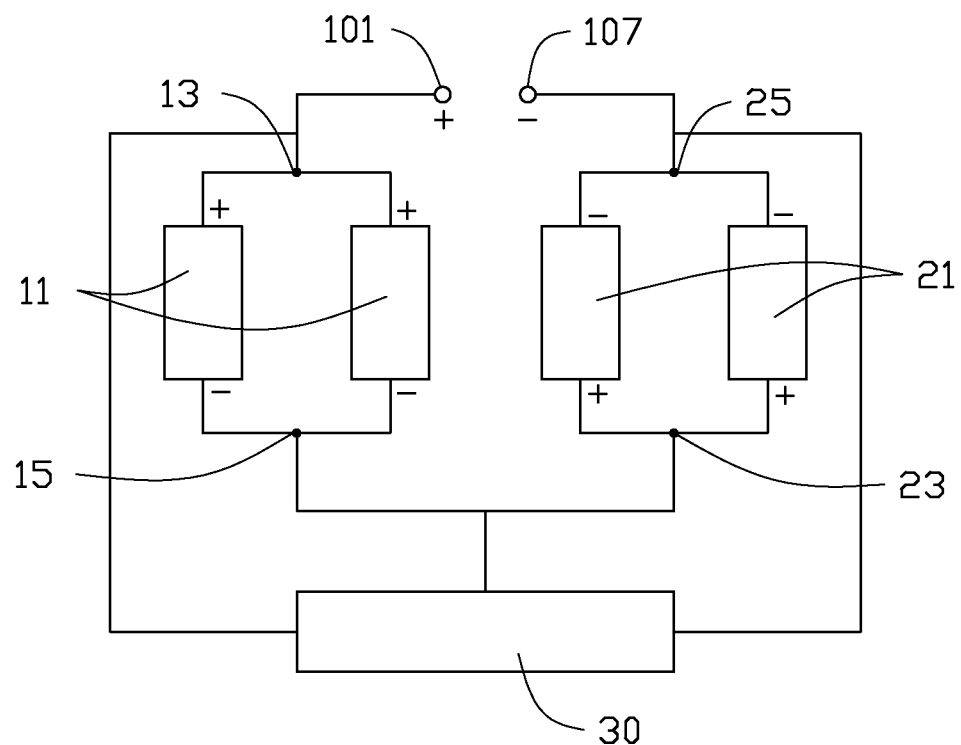
FIG. 2 is a circuit schematic view of the charge and discharge system of FIG. 1.

FIG. 1 and FIG. 2 illustrate one embodiment of a charging and discharging system. The charging and discharging system can include a battery assembly and a circuit board 100 configured for electrically connecting the battery assembly. The battery assembly can be charged by the circuit board 100 or can charge electronic devices (not shown) on the circuit board 100.

The circuit board 100 can include a positive end 101, a first coupling end 103, a second coupling end 105, and a grounded end 107. The first coupling end 103 can be electrically connected to the second coupling end 105.

The battery assembly can include a first cell assembly 10 and a second cell assembly 20.

The first cell assembly 10 can include two first cells 11, a first connecting piece 13, and a second connecting piece 15. The first connecting piece 13 can be electrically connected to the positive end 101 in series, and the positive poles of the two first cells 11 can be electrically coupled in parallel via the first connecting piece 13. The second connecting piece 15 can be electrically connected to the first coupling end 103 in series, and the negative poles of the two first cells 11 are electrically coupled in parallel via the second connecting piece 15. In one embodiment, each of the first connecting piece 13 and the second connecting piece 15 can be made of a first kind of conductor, such as nickel, and a length of the first connecting piece 13 can be substantially equal to a length of the second connecting piece 15.

The second cell assembly 20 can include two second cells 21, a third connecting piece 23, and a fourth connecting piece 25. The third connecting piece 23 can be electrically connected to the second coupling end 105 in series, and the positive poles of the two second cells 21 can be electrically connected in parallel via the third connecting piece 23. The fourth connecting piece 25 can be electrically connected to the grounded end 107 in series, and the negative poles of the two second cells 21 are electrically coupled in parallel via the fourth connecting piece 25. In one embodiment, each of the third connecting piece 23 and the fourth connecting piece 25 can be made of a second kind of metal, which has a resistivity less than each of the first connecting piece 13 and the second connecting piece 15. In the illustrated embodiment, each third connecting piece 23 and the fourth connecting piece 25 can be made of copper, and a length of the third connecting piece 23 can be substantially equal to a length of the fourth connecting piece 25.

The circuit board 100 can include a structure limiting area 200, each third connecting piece 23 and the fourth connecting piece 25 can extend over the structure limiting area 200, as a length sum of the third connecting piece 23 and the fourth connecting piece 25 is greater than a length sum of the first connecting piece 13 and the second connecting piece 15. The structure limiting area 200 can be configured for securing electronic components, such as a hard disk drive.

The circuit board 100 can further secure a controlling chip 30. The controlling chip 30 can be configured for detecting a voltage U1 between the positive end 101 and the first coupling end 103, and can further detect a voltage U2 between the second coupling end 105 and the grounded end 107. The voltage U1 can be equal to a voltage between the first connecting piece 13 and the second connecting piece 15. The voltage U2 can be equal to a voltage between the third connecting piece 23 and the fourth connecting piece 25.

When the charge and discharge system is charged, voltages U1 and U2 can increase from a lowest voltage U100, such as 3.2V. The controlling chip 30 can detect the current voltages U1 and U2. When the voltage U1 or U2 arrives to a highest voltage U200, such as 4.2 V, the controlling chip 30 can control the circuit board 100 to stop charging the first cell assembly 10 and the second cell assembly 20. A voltage between opposite ends of the first cell 11 can be defined as U10. A voltage between opposite ends of the second cell 21 can be defined as U20. A resistance of the first connecting piece 13 can be R1. A resistance of the second connecting piece 15 can be R2. A resistance of the third connecting piece 23 can be R3. A resistance of the fourth connecting piece 25 can be R4. Take a charged current 1A for example, U1=U100+U10+1A*(R1+R2), and U2=U100+U20+1A*(R3+R4). Because the length sum of the third connecting piece 23 and the fourth connecting piece 25 is greater than the length sum of the first connecting piece 13 and the second connecting piece 15, if the resistivity of the third connecting piece 23 and the fourth connecting piece 25 is equal to the resistivity of the first connecting piece 13 and the second connecting piece 15, (R1+R2)<(R3+R4), and U1<U2. Thus, the voltage U1 can reach 4.2V earlier than U2. When the voltage U1 reaches 4.2V, the controlling chip 30 can control the circuit board 100 to stop charging the first cell assembly 10 and the second cell assembly 20, which can cause the second cell assembly 20 to be inadequacy charged. In this illustrated embodiment, a resistivity of the third connecting piece 23 and the fourth connecting piece 25 can be less than a resistivity of the first connecting piece 13 and the second connecting piece 15, although the length sum of the third connecting piece 23 and the fourth connecting piece 25 is greater than the length sum of the first connecting piece 13 and the second connecting piece 15, the sum R1 plus R2 can be adjusted to be equal to sum R3 plus R4. Thus, the voltage U1 can be equal to the voltage U2, and the first cell assembly 10 can be fully charged at the same time as the second cell assembly 20.

When the charging and discharging system is discharging the electronic components, each voltage U1 and U2 can decrease from the highest voltage U200, such as 4.2V. The controlling chip 30 can detect the current voltages U1 and U2. When the voltage U1 or U2 reaches to the lowest voltage U100, such as 3.2 V, the controlling chip 30 can control the first cell assembly 10 and the second cell assembly 20 to stop charging. Take a charging current 1A for example, U1=U200-U10-1A*(R1+R2), and U2=U200-U20-1A*(R3+R4). Because the length sum of the third connecting piece 23 and the fourth connecting piece 25 can be greater than the length sum of the first connecting piece 13 and the second connecting piece 15, if the resistivity of the third connecting piece 23 and the fourth connecting piece 25 is equal to the resistivity of the first connecting piece 13 and the second connecting piece 15, (R1+R2)<(R3+R4), and U1>U2. Thus, the voltage U2 reaches 3.2V earlier than U1, when the voltage U2 reaches 3.2V, the controlling chip 30 can control the first cell assembly 10 and the second cell assembly 20 to stop discharging, which may cause the first cell assembly 10 to be inadequacy discharged and a waste power. In this illustrated embodiment, the resistivity of the third connecting piece 23 and the fourth connecting piece 25 can be less than a resistivity of the first connecting piece 13 and the second connecting piece 15, although the length sum of the third connecting piece 23 and the fourth connecting piece 25 is greater than the length sum of the first connecting piece 13 and the second connecting piece 15, the sum R1 plus R2 can be adjusted to equal sum R3 plus R4. Thus, the voltage U1 can be equal to the voltage U2, and the first cell assembly 10 can be fully discharged at the same time as the second cell assembly 20.

It is to be understood that even though numerous characteristics and advantages have been set forth in the foregoing description of embodiments, together with details of the structures and functions of the embodiments, the disclosure is illustrative only and changes may be made in detail, including in the matters of shape, size, and the arrangement of parts within the principles of the disclosure. The embodiments discussed herein do not limit the following claims.

What is claimed is:

1. A charging and discharging system comprising:
    a first cell assembly comprising a first cell, a first connecting piece, and a second connecting piece;
    a second cell assemble comprising a second cell, a third connecting piece, and a fourth connecting piece; and
    a circuit board comprising a positive end, a coupling end, and a grounded end;
    wherein the first connecting piece, a positive pole of the first cell, and the positive end are connected in series; the second connecting piece, a negative pole of the first cell, and the coupling end are connected in series; the third connecting piece, a positive end of the second cell, and the coupling end are connected in series; the fourth connecting piece, a negative end of the second cell, and the grounded end are connected in series; a length of the third connecting piece and the fourth connecting piece is greater than that of the first connecting piece and the second connecting piece; and a resistivity of the third connecting piece and the fourth connecting piece is less than that of the first connecting piece and the second connecting piece.

2. The charging and discharging system of claim 1, wherein a length of the first connecting piece is equal to a length of the second connecting piece, and a length of the third connecting piece is equal to a length of the fourth connecting piece.

3. The charging and discharging system of claim 1, wherein a resistivity of the first connecting piece is equal to a resistivity of the second connecting piece, and a resistivity of the third connecting piece is equal to a resistivity of the fourth connecting piece.

4. The charging and discharging system of claim 3, wherein each of the first connecting piece and the second connecting piece is made of nickel, and each of the third connecting piece and the fourth connecting piece is made of copper.

5. The charging and discharging system of claim 1, wherein a controller is secured to the circuit board, the controller is configured for detecting a voltage U1 across the first connecting piece and the second connecting piece, and the controller is further configured for detecting a voltage U2 across the third connecting piece and the fourth connecting piece; when the charge and the discharge system is charged, the controller stops the circuit board charging the first cell assembly and the second cell assembly when the voltage U1 or U2 is arrived to a highest voltage U200; and when the charge and the discharge system is discharged, the controller stops the first cell assembly and the second cell assembly discharging when the voltage U1 or U2 is arrived to a lowest voltage U100.

6. The charging and discharging system of claim 5, wherein when the charge and the discharge system is charged, a voltage across the first cell is U10, a resistance of the first connecting piece is R1, a resistance of the second connecting piece is R2, a voltage across the second cell is U20, a resistance of the third connecting piece is R3, a resistance of the fourth connecting piece is R4, a charging current is I1, U1=U100+U10+I1*(R1+R2), U2=U100+U20+I1*(R3+R4); and when the charge and the discharge system is discharged, a discharging current is I2, U1=U200-U10-I2*(R1+R2), U2=U200-U10-I2*(R3+R4), I1*(R1+R2)=I1*(R3+R4), I2*(R1+R2)=I2*(R3+R4).

7. The charging and discharging system of claim 1, wherein the circuit board defines a structure limiting area, which is configured for securing electronic components, the third connecting piece is electrically coupled to the coupling end across the structure limiting area, and the fourth connecting piece is electrically coupled to the grounded end across the structure limiting area.

8. A charging and discharging system comprising:
    a first cell assembly comprising a first cell, a first connecting piece, and a second connecting piece;
    a second cell assemble comprising a second cell, a third connecting piece, and a fourth connecting piece;
    a circuit board comprising a positive end, a coupling end, and a grounded end; and
    a controller secured to the circuit board and configured for detecting a voltage U1 across the first connecting piece and the second connecting piece, and a voltage U2 across the third connecting piece and the fourth connecting piece;
    wherein the first connecting piece, a positive pole of the first cell, and the positive end are connected in series; the second connecting piece, a negative pole of the first cell, and the coupling end are connected in series; the third connecting piece, a positive end of the second cell, and the coupling end are connected in series; the fourth connecting piece, a negative end of the second cell, and the grounded end are connected in series; when the charge and the discharge system is charged, the controller stops the circuit board charging the first cell assembly and the second cell assembly when the voltage U1 or U2 is arrived to a highest voltage U200; and when the charge and the discharge system is discharged, the controller stops the first cell assembly and the second cell assembly discharging when the voltage U1 or U2 is arrived to a lowest voltage U100.

9. The charging and discharging system of claim 8, wherein a length of the third connecting piece and the fourth connecting piece is greater than that of the first connecting piece and the second connecting piece; a resistivity of the third connecting piece and the fourth connecting piece is less than that of the first connecting piece and the second connecting piece.

10. The charging and discharging system of claim 8, wherein a length of the first connecting piece is equal to a length of the second connecting piece, and a length of the third connecting piece is equal to a length of the fourth connecting piece.

11. The charging and discharging system of claim 8, wherein a resistivity of the first connecting piece is equal to a resistivity of the second connecting piece, and a resistivity of the third connecting piece is equal to a resistivity of the fourth connecting piece.

12. The charging and discharging system of claim 11, wherein each of the first connecting piece and the second connecting piece is made of nickel, and each of the third connecting piece and the fourth connecting piece is made of copper.

13. The charging and discharging system of claim 8, wherein when the charge and the discharge system is charged, a voltage across the first cell is U10, a resistance of the first connecting piece is R1, a resistance of the second connecting piece is R2, a voltage across the second cell is U20, a resistance of the third connecting piece is R3, a resistance of the fourth connecting piece is R4, a charging current is I1, U1=U100+U10+I1*(R1+R2), U2=U100+U20+I1*(R3+R4); and when the charge and the discharge system is discharged, a discharging current is I2, U1=U200-U10-I2*(R1+R2), U2=U200-U10-I2*(R3+R4), I1*(R1+R2)=I1*(R3+R4), I2*(R1+R2)=I2*(R3+R4).

14. The charging and discharging system of claim 8, wherein the circuit board defines a structure limiting area, which is configured for securing electronic components, the third connecting piece is electrically coupled to the coupling end across the structure limiting area, and the fourth connecting piece is electrically coupled to the grounded end across the structure limiting area.

* * * * *